United States Patent

[11] 3,608,702

| [72] | Inventor | Joseph Fraioli, Sr.<br>300 Martin Ave., White Plains, N.Y. 10601 |
|---|---|---|
| [21] | Appl. No. | 861,645 |
| [22] | Filed | Sept. 29, 1969 |
| [45] | Patented | Sept. 28, 1971 |

[54] CONVEYOR BELT
7 Claims, 4 Drawing Figs.

[52] U.S. Cl. .................................................... 198/193,
198/198
[51] Int. Cl. ..................................................... B65g 15/42
[50] Field of Search ......................................... 198/193,
194, 198; 107/57

[56] References Cited
UNITED STATES PATENTS
2,199,529 5/1940 Shackelford ................. 198/193 X
2,575,813 11/1951 Hutchins ...................... 198/198

Primary Examiner—Gerald M. Forlenza
Assistant Examiner—Jerold M. Forsberg
Attorney—Michael Ebert ABSTRACT: A conveyor belt for transporting impressionable articles such as baking dough without sticking or slippage, the face of the moving belt slidably engaging the undersurface of rails or other fixed elements. The belt is constituted by a reinforcing core of interlinked wire coils or woven wire mesh having a low coefficient of friction, almost entirely embedded in a layer of silicone rubber or other nonadhesive material having a high coefficient of friction, whereby only the upper points of the core are exposed. These points make contact with the undersurface of the rails to facilitate a sliding action therebetween, whereas the articles are impressed by the points and mainly engage the high drag surface of the layer.

PATENTED SEP 28 1971
3,608,702
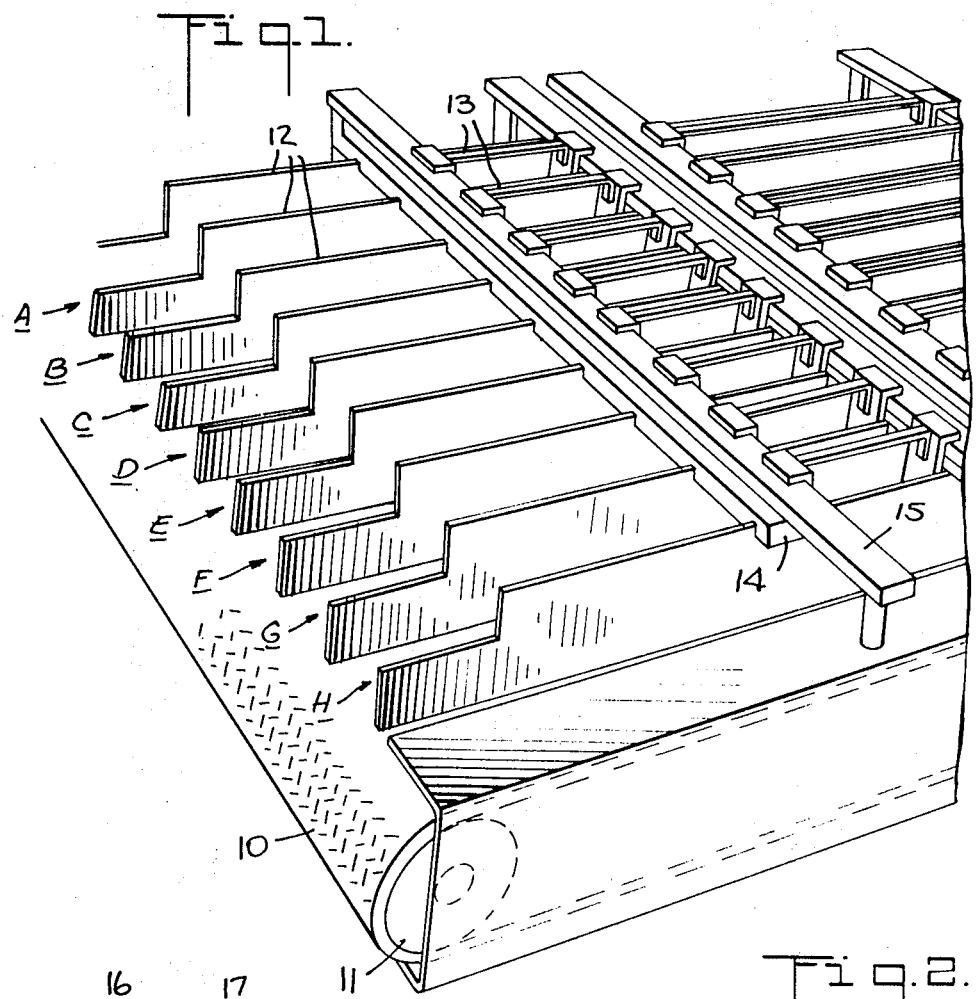
Fig.1.
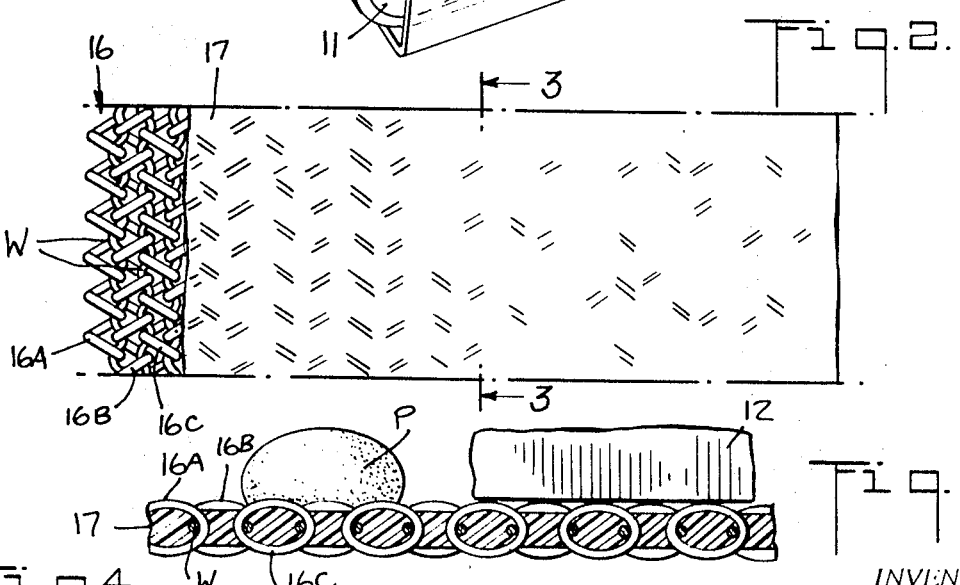
Fig.2.
Fig.3.
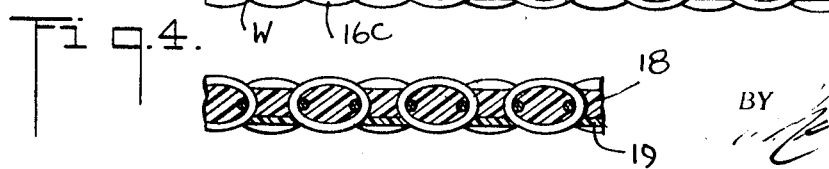
Fig.4.
INVENTOR.
JOSEPH FRAIOLI, SR.
BY
ATTORNEY 3,608,702

CONVEYOR BELT

RELATED APPLICATION

This application is related to my copending application Ser. No. 724,534, filed Apr. 26, 1968, issued on July 21, 1970 as U.S. Pat. No. 3,521,578.

BACKGROUND OF INVENTION

This invention relates generally to conveyor belts, and more particularly to a belt which affords a high coefficient of friction with respect to items to be conveyed thereby, and a low coefficient of friction with respect to rails or other fixed elements which slidably engage the surface of the moving belt.

In my above-identified copending application, there is disclosed a baking dough rounder and molding machine wherein raw dough which is divided into individual, unshaped pieces, is deposited onto a continuous conveyor belt that transports the pieces through a bank of processing channels defined by parallel rails or partitions disposed above the belt. The rails are spring biased to maintain contact with the upper surface of the moving belt. Disposed within each channel is a molding shoe which is contoured to impart a desired shape to the advancing dough pieces engaged thereby.

In order for a machine of this type to operate efficiently, it is essential that the surface of the belt have a high drag characteristic to prevent slippage of the dough pieces borne thereby, particularly when they are engage by the molding shoes. At the same time, the surface must be of a character which is free of any tendency to stick to the dough pieces.

The high coefficient of friction and nonstick belt characteristics necessary to meet the above requirements, are inherently incompatible with the surface requirements of the belt with respect to the rails, in that for this purpose the belt should be able to slide easily along the edges of the rails in contact therewith.

While the invention will be described in connection with a bakery machine, it will be understood that it is not limited to this application and that the belt in accordance with the invention may be used wherever a belt is intended to make sliding contact with a rail or other fixed element, and at the same time to transport products without slippage.

BRIEF DESCRIPTION OF INVENTION

In view of the foregoing, it is the main object of this invention to provide a conveyor belt for efficiently conveying articles, which belt has a high coefficient of friction with respect to these articles, and a low coefficient of friction with respect to rails or other fixed elements slidably engaging the moving surface of the belt.

Yet another object of the invention is to provide a conveyor belt characterized by a high drag characteristic respecting pieces conveyed thereby, the surface of the belt nevertheless being of a material which is nonadhesive with reference to the pieces, thereby obviating sticking, particularly when the pieces are impressionable pieces of baking dough.

Also an object of the invention is to provide a reinforced conveyor belt of high strength and long life, which belt may be manufactured at relatively low cost.

Still another object of the invention is to provide a technique for fabricating a belt of the above-described type.

Briefly stated, these objects are accomplished in a reinforced conveyor belt comprising a three-dimensional core formed of interlinked wire coils or woven wire mesh having a low coefficient of friction, which core is almost fully embedded in a layer of silicone rubber or other nonstick material having a high coefficient of friction, whereby only the upper points of the core are exposed, which points are adapted to make contact with the edges of rails or other fixed elements to facilitate a sliding action therebetween.

BRIEF DESCRIPTION OF DRAWING

For a better understanding of the invention as well as other objects and further features thereof, reference is made to the following detailed description to be read in conjunction with the accompanying drawing, wherein:

FIG. 1 is a perspective view of a bakery machine including a reinforced belt in accordance with the invention;

FIG. 2 is a plan view of the belt;

FIG. 3 is a longitudinal section taken in the plane indicated by line 3—3 in FIG. 2; and FIG. 4 is a section taken through a modified form of belt.

DESCRIPTION OF INVENTION

Referring now to FIG. 1, there is shown by way of example, one application for a belt 10 in accordance with the invention, the belt in this instance being included in a bakery machine of the type disclosed in the above-identified patent application. Belt 10 runs between two rollers, only roller 11 being shown in this figure.

Mounted above conveyor belt 10 are guide rails or partitions 12 in spaced parallel relation to define an array of eight processing channels A to H, within which are disposed a group of molding shoes 13 adapted to round the pieces of dough engaged thereby.

Rails 12 are maintained at their properly spaced vertical positions by a spacer bar 14 which is placed directly below a crosspiece 15 bridged across the belt. Biasing spring (not shown) are interposed between the crosspiece and spacer bar to urge the lower edges of the rails against belt 10. For this purpose, the belt must have a low coefficient of friction, for otherwise the rails pressed thereagainst would interfere with belt movement.

In operation, raw pieces of dough deposited at the input end of conveyor belt 10 in channels A to H, are transported thereby to engage the molding shoes 13, the shoes being forced by the advancing dough pieces to rise within their confined spaces to round the pieces within the molding passages.

In order to effectively transport the dough pieces, it is desirable for the belt to have a high drag characteristic, that is, a high coefficient of friction. This requirement is obviously inconsistent with the low drag requirement with respect to the fixed rails engaging the belt. At the same time, the belt must be free of any tendency to stick to the dough pieces.

A belt which satisfies all of these requirements is disclosed in FIGS. 2 and 3, where belt 10 is constituted by a three-dimensional core 16 formed by interlinked coils 16A, 16B, 16C, etc. Each coil includes a series of convolutions wound upon an undulating cross wire W which is encircled by each the convolutions of the adjacent coil, thereby interlinking the coils. In practice, core 16 may be formed of stainless steel, nylon, Teflon, or other metallic or plastic wire of high tensile strength and having a low coefficient of friction.

Core 16 is almost fully embedded in a layer of silicone rubber 17 or other material providing a high coefficient of friction and yet free of any tendency to stick to dough pieces. In practice, the belt is made by placing the core within a channel-shaped mold and then filling the mold with a silicone rubber solution of the proper consistency (such as G.E.'s KTV–120), the solution being permitted to cure at air temperature.

The layer is formed so as to expose only the upper points of the wire convolutions, Thus, as shown in FIG. 3, downwardly biased rail 12 is disposed with its lower edge in sliding engagement with these smooth points, whereas dough piece P, which is impressionable, sinks into contact with the silicone rubber layer, whereby the piece is transported without slippage. That is to say, the wire points are impressed into the soft dough so that body thereof lies in contact with the layer.

In some instances it is necessary not only to have the face of the belt afford a slippery surface with respect to fixed rails, but also to have a slippery belt underface where, for example, the belt runs over guide plates rather than rollers. To provide a belt suitable for this purpose, FIG. 4 shows a belt with a wire core 16 as in the previous embodiment, which core is almost fully embedded in a two-ply layer, the upper and main ply 18 being formed of silicone rubber, the thinner underply 19 being formed of a flexible plastic material such as Teflon or polypropylene, having a low coefficient of friction. The upper ply provides the necessary drag relative to the dough pieces, whereas the lower ply is smooth, as required, to slide over the engaging plates.

While there have been shown and described preferred embodiments of conveyor belts in accordance with the invention, it will be appreciated that many changes and modifications may be made therein without, however, departing from the essential spirit of the invention. Thus, the core need not be formed of coils, as shown, but may be in three-dimensional woven form.

What I claim is:

1. A reinforced belt adapted to transport impressionable articles in a machine wherein the surface of the belt is slidably engaged by fixed elements such as rails, the belt comprising:

A. a three-dimensional core formed of wire having a low coefficient of friction, and
   B. a layer of flexible material having a relatively high coefficient of friction, said core being almost fully embedded in said layer to expose only the upper points thereof, which points engage said fixed element while said articles engage said layer.

2. A belt as set forth in claim 1, wherein said core is formed by interlinked coils of metallic wire.

3. A belt as set forth in claim 1, wherein said core is formed by wire mesh.

4. A belt as set forth in claim 1, wherein said wire is stainless steel.

5. A belt as set forth in claim 1, wherein said layer is formed of silicone rubber.

6. A belt as set forth in claim 1, wherein said layer has an underply of material having a low coefficient of friction.

7. A belt as set forth in claim 6, wherein said underply is formed of polypropylene.